(12) United States Patent
Reinart

(10) Patent No.: US 9,229,953 B2
(45) Date of Patent: Jan. 5, 2016

(54) GEO-ENABLING OF DATA SOURCES

(71) Applicant: Manfred Reinart, Germersheim (DE)

(72) Inventor: Manfred Reinart, Germersheim (DE)

(73) Assignee: SAP SE, Walldorf (DE)

(*) Notice: Subject to any disclaimer, the term of this patent is extended or adjusted under 35 U.S.C. 154(b) by 191 days.

(21) Appl. No.: 13/802,010

(22) Filed: Mar. 13, 2013

(65) Prior Publication Data

US 2014/0279829 A1    Sep. 18, 2014

(51) Int. Cl.
*G06F 17/00* (2006.01)
*G06F 17/30* (2006.01)

(52) U.S. Cl.
CPC .............................. *G06F 17/30241* (2013.01)

(58) Field of Classification Search
CPC .......... G06F 17/30241; G06F 17/3087; G06F 17/3053; G06F 17/30867; G06F 17/30864
USPC ....................................................... 707/724
See application file for complete search history.

(56) References Cited

U.S. PATENT DOCUMENTS

| | | |
|---|---|---|
| 6,941,184 B2 | 9/2005 | Ebert |
| 7,400,770 B2 | 7/2008 | Keaton et al. |
| 8,385,964 B2 | 2/2013 | Haney |
| 8,606,021 B2 | 12/2013 | Conwell |
| 2004/0236620 A1 | 11/2004 | Chauhan et al. |
| 2007/0027997 A1 | 2/2007 | Polk |
| 2007/0173956 A1* | 7/2007 | Koch et al. ................... 700/6 |
| 2007/0195712 A1 | 8/2007 | Thayer et al. |
| 2010/0114941 A1 | 5/2010 | Kaenel et al. |
| 2010/0145947 A1* | 6/2010 | Kolman et al. .......... 707/736 |
| 2010/0211614 A1 | 8/2010 | Stuhec |
| 2011/0161137 A1 | 6/2011 | Ubalde et al. |
| 2013/0030967 A1 | 1/2013 | Prasad et al. |
| 2013/0132375 A1 | 5/2013 | Jones et al. |
| 2013/0159468 A1* | 6/2013 | Kusterer et al. .......... 709/219 |
| 2014/0006072 A1 | 1/2014 | Buecheler et al. |
| 2014/0006208 A1 | 1/2014 | Fuhge et al. |
| 2014/0047356 A1 | 2/2014 | Baumberghen et al. |

* cited by examiner

*Primary Examiner* — Truong Vo

(74) *Attorney, Agent, or Firm* — Schwegman Lundberg & Woessner, P.A.

(57) ABSTRACT

A method includes receiving data from a non-geo enabled data source, obtaining information related to location in the received data, converting the obtained information to a standardized form of geo-location data, and storing the geo-location data.

20 Claims, 6 Drawing Sheets

```
601 — <xsl:element name="entry">
602 —   <xsl:apply-templates/>
603 —   <xsl:comment>Added GeoRSS Point out of OData content fields</xsl:comment>
604 —   <xsl:element name="point" namespace="http://www.georss.org/georss">
605 —     <xsl:value-of select="atom:content/m:properties/d:Latitude"/>
606 —     <xsl:text> </xsl:text>
607 —     <xsl:value-of select="atom:content/m:properties/d:Longitude"/>
608 —   </xsl:element>
609 — </xsl:element>
610 — </xsl:template>
611 — <xsl:template match="@*|node()"/>
612 —   <xsl:copy>
613 —     <xsl:apply-templates select="@*|node()"/>
614 —   <xsl:copy>
```

FIG. 6

```
<?xml version="1.0" encoding="UTF-8"?>
<entry xmlns:georss="http://www.georss.org/georss" xmlns:d="http://schemas.microsoft.com/ado/2007/08/dataservices"
xmlns:m="http://schemas.microsoft.com/ado/2007/08/dataservices/metadata" xmlns="http://www.w3.org/2005/Atom"
xml:base="http://sclcrta:50088/sap/opu/odata/sap/ZZZ_AppEntity/">
    <!-- added GeoRSS namespace reference -->
    <id>http://sclcrta:50088/sap/opu/odata/sap/ZAR_FE7/AppEntityCollection('50000109')</id>
    <title type="text">AppEntityCollection('50000109')</title>
    <updated>2012-12-19T08:28:52Z</updated>
    <category scheme="http://schemas.microsoft.com/ado/2007/08/dataservices/scheme"
    term="ZZZ_AppEntity.AppEntity"/>
    <link title="AppEntity" rel="edit" href="AppEntityCollection('50000109')"/>
    <link title="AppEntity_To_AppEntity_MPO" type="application/atom+xml;type=feed"
    rel="http://schemas.microsoft.com/ado/2007/08/dataservices/related/AppEntity_To_AppEntity_MPO"
    href="AppEntityCollection('50000109')/AppEntity_To_AppEntity_MPO"/>
    <link title="AppEntity_To_AppEntity_Material" type="application/atom+xml;type=feed"
    rel="http://schemas.microsoft.com/ado/2007/08/dataservices/related/AppEntity_To_AppEntity_Material"
    href="AppEntityCollection('50000109')/AppEntity_To_AppEntity_Material"/>
    <content type="application/xml">
```

*FIG. 7A*

```xml
<m:properties>
    <d:AppEntity_Object_ID>50000109</d:AppEntity_Object_ID>
    <d:Object_Name>Name of 50000109</d:Object_Name>
    <d:Object_Abbreviation>Abbreviation of 50000109</d:Object_Abbreviation>
    <d:Owner_Nation>KL</d:Owner_Nation>
    <d:Service_Type>M</d:Service_Type>
    <d:Longitude>8.0000000000000</d:Longitude>
    <d:Latitude>49.0000000000000</d:Latitude>
    <d:Altitude>230.000</d:Altitude>
    <d:WKID>4326</d:WKID>
    <d:Start_Date>2007-09-23T00:00:00</d:Start_Date>
    <d:End_Date>9999-12-31T00:00:00</d:End_Date>
</m:properties>
</content>
<!-- Added GeoRSS Point element in <entry> -->
<georss:point>49.0000000000000 8.0000000000000</georss:point>
</entry>
```

*FIG. 7B*

GEO-ENABLING OF DATA SOURCES

BACKGROUND

Many applications utilize geo location information. The information may be received from different sources, and should be in a format usable by the application. Many information sources are not able to provide the geo location information in the format utilized by consuming applications or have not been conceived to provide geo information.

SUMMARY

A method includes receiving data from a non-geo enabled data source, obtaining information related to location in the received data, converting the obtained information to a standardized form of geo-location data, and storing the geo-location data.

A computer readable storage device has instructions for causing a computer to execute a method, the method including receiving data from a non-geo enabled data source, obtaining information related to location in the received data, converting the obtained information to a standardized form of geo-location data, and storing the geo-location data.

A system includes a communication connection to receive data from a non-geo enabled data source. A programmed processor is coupled to receive the data from the communication connection to obtain information related to location in the received data. The processor is further programmed to convert the obtained information to a standardized form of geo-location data. A storage device is coupled to the processor to store the geo-location data.

BRIEF DESCRIPTION OF THE DRAWINGS

FIG. 6 illustrated example code to identify a location tracking code and obtain tracking information according to an example embodiment.

FIGS. 7A and 7B illustrate example code to obtain RSS data from source data according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
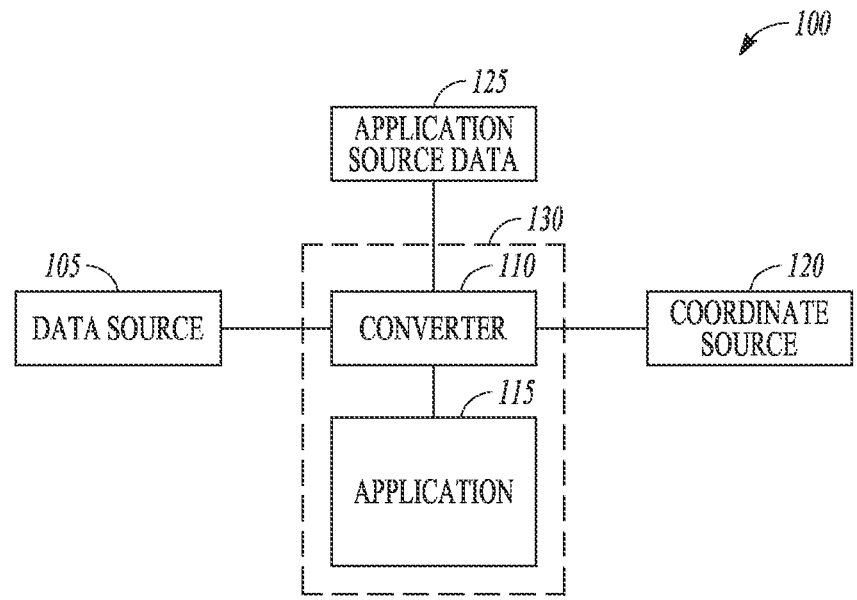
FIG. 1 is a block diagram of a system to convert data from a non geo-enabled source into geo-location data according to an example embodiment.

FIG. 1 is a block diagram of a system 100 to convert data from a non geo-enabled data source into geo-location data according to an example embodiment. A non-geo-enabled source 105 provides data that is not in a geo-location data format. The data source 105 can be an application running on a network connected computer or a cloud type of environment in various embodiments that is not adapted to provide geo-location data format that can be used for geospatial visualization and analysis purposes.

A converter 110 receives the information from the data source 105. In one embodiment, the source provides data referred to as a data payload and uses the data to obtain geo-information and convert the geo-information into a standard geo-location data format, such as GeoRSS, that is useable by an application 115. In one embodiment, the data payload may be processed in several different ways. Where the data payload is obtained from an application running on the same or a different server, the converter 110 may be part of an interception point between the data source 105 and an application 115. An example interception point includes SAP OData interfaces interception points on SAP Gateway, which can be adapted via programming to post-process the data payload and enhance the output format.

Various resources may be used to assist in the conversion of the payload data. A coordinate source 120 may be used if a street address is obtained by the converter from the payload data. The street address is simply provided to the coordinate source 120, which may be located on a same or different computer system in various embodiments. Similarly, the payload data may contain information that can be used to identify a further source of data, such as an application data source 125, which may contain a street address or other information that can be utilized to obtain information which can ultimately lead to data that can be converted to the desired geo information format.

The payload data can be transformed by the converter 110 to an enhanced form of the same/basic payload format (e.g. enhance Atom-Feed format with OData payload to GeoRSS with OData payload) and stored on a computer readable storage device. The converter 110 may also be adapted to produce a different format (e.g. GeoJSON or GML). In one embodiment, a transformed representation of the original payload may be stored with the enhanced form.

Several different examples of source data (payload data) and transformations may be used. In a first example, the payload data may already contain some fields that may be interpreted by geospatially enabled tools, such as latitude/longitude fields.

In a second example, the payload data may contain address fields, such as an address of a building or location.

In a third example, the payload data may contain identifying address number information—without address data. This is a common case for a data source that provides business suite data which often contain some Address-ID of the basic address management In a fourth example, the data payload may only contain business data (master or transactional data) without reference to geo-location/address information available in the providing system.

For examples 1-3, the determination of appropriate data fields in the data content payload can be done by configuration, annotation of metadata or by deduction from a database data dictionary (DDIC) type. The determination of the fields may be based on the field data elements or domains (e.g. latitude and longitude fields often use DDIC Data Elements GEOLAT/GEOLON and domain GEOLATLON, Domain ADRNR for address numbers).

For example 1, the converter 110 uses the content of the data fields in the payload and replicates the data in the correct format of the chosen geo-enabled data format. For example 2, the same principle may be applied to available address data in the data payload, optionally utilizing coordinate source 120.

For example 3, the plain address information can be looked up in the basic address management of the system based on the address number from the payload.

For example 4, a configuration rule or metadata annotation may be defined which determines from which data fields the ID of a business object (residing on either application data source 125 or application 115) can be derived and how this ID can be mapped to the corresponding geo-location or address from an appropriate data source (e.g. with tracking information). Identifying information like the ID of a vessel or the license plate number of a car or the ID of a mobile device or user can be mapped to a tracking service object ID like e.g. AIS (for ships). The geo-location or address information would result from the lookup of the current position/address at such a tracking provider.

Depending on the capabilities of the geo-enabled target format chosen, geo-location data or address data can be put in the resulting data format as is—if the format of the data made available from the payload matches the specification of the target format transformed from geo-coordinates to address or format would only accept one of these two options.

Figure 2:
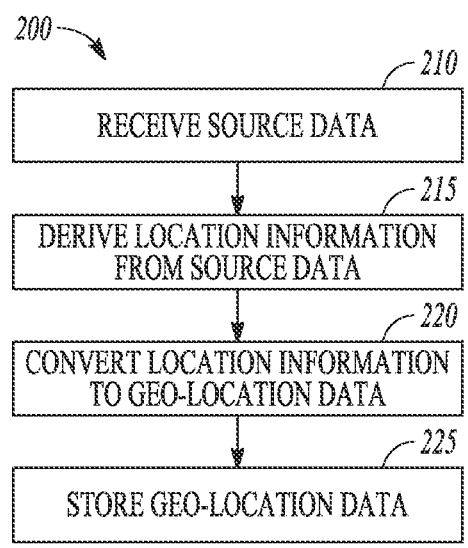
FIG. 2 is a flowchart illustrating a method of converting received source data into geo-location data according to an example embodiment.

FIG. 2 is a flowchart illustrating a method 200 of converting received payload data into geo location data according to an example embodiment. At 210, the payload data is received. The payload data may not contain geo-location data in a format that is compatible with an application. The converter 110 receives the payload data and at 215, derives location information from the payload data. In different embodiments, the payload data may be received from a local or remote application or a database, or any other type of source capable of providing payload data.

At 220, the location information is converted to geo-location data in a form useable by the application 115. The geo-location data may be stored at 225 in a storage device that is accessible to the application for use without having to modify the application to utilize the stored data. In some embodiments, the converter 110 function may be separate from the application 115, or may be integrated into or callable by the application 115. In further embodiments, the converter 110 is positioned to intercept the source data and provide geo-information to the application to make it appear that the data source is providing the geo-information directly to the application.

Figure 3:
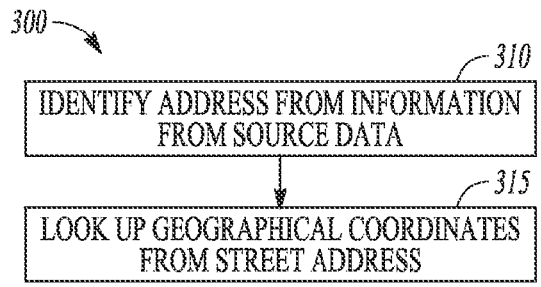
FIG. 3 is a flowchart illustrating a method of identifying an address from source data and obtaining geographical coordinates from the address according to an example embodiment.

FIG. 3 is a flowchart illustrating a method 300 of identifying an address from payload data and obtaining geographical coordinates from the address according to an example embodiment. At 310, a street address is identified in the source information received from a data source by the converter 110. The street address may be identified via DDIC definitions or schema data from a database providing the payload data. At 315, the street address is used to look up geographical coordinates from the street address from coordinate source 120, and then convert the coordinates to the desired geo-information format.

Figure 4:
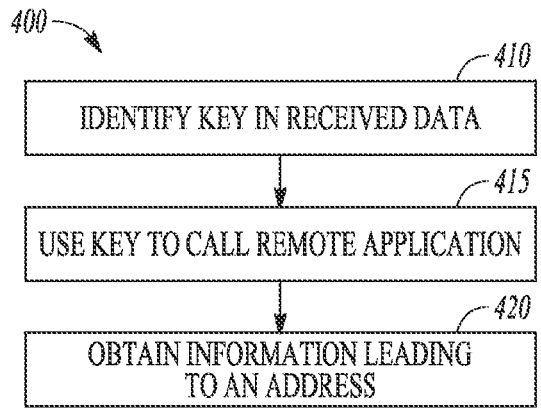
FIG. 4 is a flowchart illustrating a method of identifying a key in received data and obtaining information leading to an address according to an example embodiment.

FIG. 4 is a flowchart illustrating a method 400 of identifying a key in received data and obtaining information leading to an address according to an example embodiment. At 410, a key is identified in the source information. The key may be a database key or other term that can be used to call a remote application at 415 and obtain information leading to an address at 420. For example, a key may be an employee ID. The ID may be used to find an employee name, which may then further be used to find a street address for the employee. There may be several sources of information, such as different databases or tables within a database that are utilized to obtain the street address from the original key. The street address may then be used to obtain geo-coordinates, which may then be converted to the geo-location data.

Figure 5:
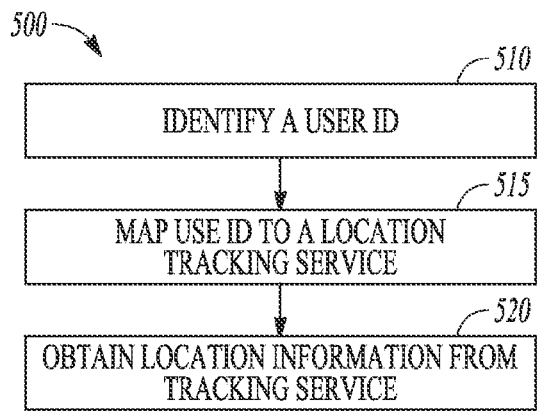
FIG. 5 is a flowchart illustrating a method of identifying a location tracking service to obtain location information according to an example embodiment.

FIG. 5 is a flowchart illustrating a method 500 of identifying a location tracking service to obtain location information according to an example embodiment. A user ID may be identified from the payload data at 510 and mapped to a location tracking service 515. The user ID may be a cell phone, or any type of transponder ID that may be used to locate a vehicle, ship, or other object equipped with the transponder. Once the tracking service is identified, the location information may be obtained from the tracking service at 520 and converted to a desired geo format for use directly by the application 115.

Example code for converting a geo-coordinates to GeoRSS formatted data is illustrated at 600 in FIG. 6 at lines 601-614. At 601, an element "entry" is defined. A template is applied at 602. Line 603 is a comment regarding obtaining GeoRSS data from the source data, referred to as OData. At 604, an element name is defined as "point". Lines 605, 606, 607, 608, 609, 610, 611, 612, 613, and 614 operate to obtain a latitude and longitude from the OData and concatenate them to obtain the GeoRSS formatted data, which is stored.

FIGS. 7A and 7B illustrate example code to obtain RSS data from source data as indicated generally at 700, and to use the RSS data to obtain coordinates and convert the coordinates to GeoRSS formatted data generally at 705.

Figure 8:
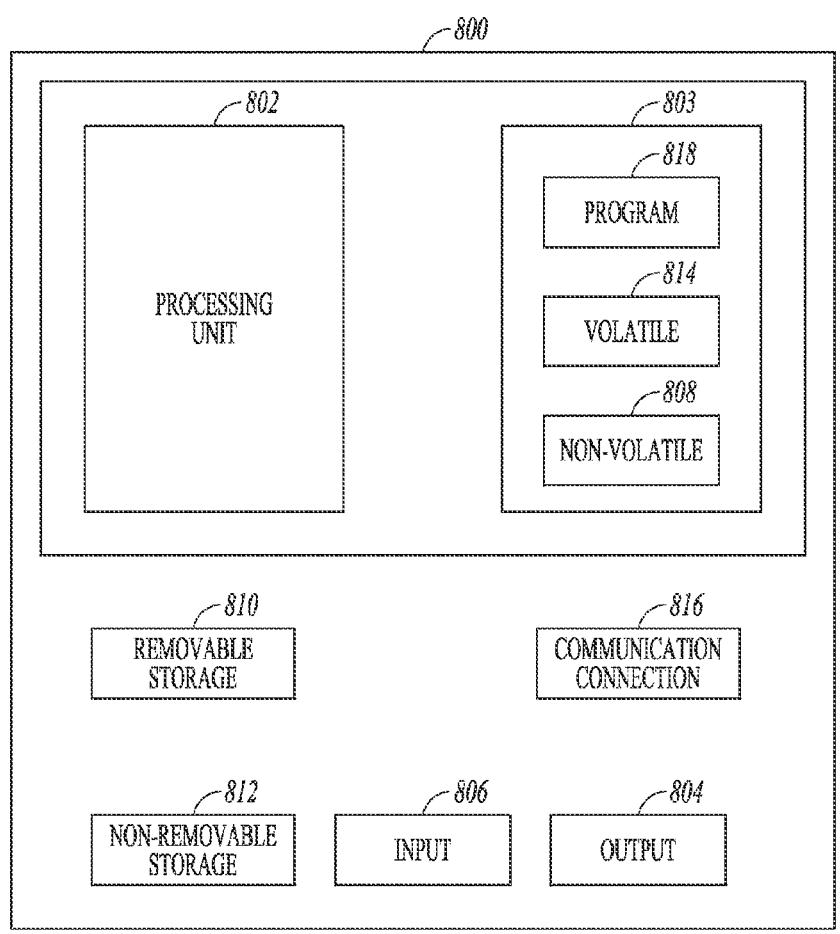
FIG. 8 is a block diagram of a computer system for executing one or more methods according to example embodiments.

FIG. 8 is a block diagram of a computer system for executing one or more methods according to example embodiments. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a non-transitory computer-readable medium. For example, a computer program 825 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 810 to provide generic access controls in a COM based computer network system having multiple users and servers.

EXAMPLES

Example 1

A method comprising:
receiving data from a non-geo enabled data source;
obtaining information related to location in the received data;
converting the obtained information to a standardized form of geo-location data; and
storing the geo-location data.

Example 2

The method of example 1 and further comprising storing the received data with the geo-location data.

Example 3

The method of any one of examples 1-2 wherein obtaining information related to location comprises:
identifying a physical address in the received data; and
looking up geographical coordinates from the physical address.

Example 4

The method of example 3 and further comprising formatting the geographical coordinates comprising latitude and longitude in a concatenated form.

Example 5

The method of any one of examples 3-4 wherein looking up geographical coordinates comprises calling a remote service to translate the physical address into standard geo coordinates.

Example 6

The method of any one of examples 3-5 wherein identifying a physical address in the received data comprises:
identifying a key in the received data; and
using the key to call a remote application to obtaining information leading to a physical address.

Example 7

The method of example 6 wherein the key comprises business data and wherein the remote application comprises business object.

Example 8

The method of any one of examples 1-7 wherein the method is performed by a computer executing code separate from the non-geo enabled data source.

Example 9

The method of any one of examples 1-8 wherein obtaining information related to location comprises:
identifying a user id;
mapping the user id to a location tracking service.

Example 10

The method of example 9 wherein obtaining information related to location comprises calling the location tracking service to obtain the information related to location.

Example 11

A computer readable storage device having instructions for causing a computer to execute a method, the method comprising:
receiving data from a non-geo enabled data source;
obtaining information related to location in the received data;
converting the obtained information to a standardized form of geo-location data; and
storing the geo-location data.

Example 12

The computer readable storage device of example 11 wherein obtaining information related to location comprises:
identifying a physical address in the received data; and
looking up geographical coordinates from the physical address.

Example 13

The computer readable storage device of example 12 and further comprising formatting the geographical coordinates comprising latitude and longitude in a concatenated form.

Example 14

The computer readable storage device of any one of examples 12-13 wherein identifying a physical address in the received data comprises:
 identifying a key in the received data; and
 using the key to call a remote application business object to obtaining information leading to a physical address.

Example 15

The computer readable storage device of any one of examples 11-14 wherein obtaining information related to location comprises:
 identifying a user id; and
 mapping the user id to a location tracking service, and wherein obtaining information related to location comprises calling the location tracking service to obtain the information related to location.

Example 16

A system comprising:
 a communication connection to receive data from a non-geo enabled data source;
 a programmed processor coupled to receive the data from the communication connection to obtain information related to location in the received data;
 the processor further programmed to convert the obtained information to a standardized form of geo-location data; and
 a storage device coupled to the processor to store the geo-location data.

Example 17

The system of example 16 wherein the processor programmed to convert the obtained information:
 identifies a physical address in the received data;
 looks up geographical coordinates from the physical address; and
 formats the geographical coordinates comprising latitude and longitude in a concatenated form.

Example 18

The system of example 17 wherein looking up geographical coordinates comprises calling a remote service to translate the physical address into standard geo coordinates.

Example 19

The system of any one of examples 17-18 wherein processor programmed to identify the physical address in the received data:
 identifies a key in the received data; and
 uses the key to call a remote application to obtaining information leading to a physical address, wherein the key comprises business data and wherein the remote application comprises business object.

Example 20

The system of any one of examples 16-19 wherein the processor programmed to obtain information related to location:
 identifies a user id;
 maps the user id to a location tracking service; and
 calls the location tracking service to obtain the information related to location.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
 receiving data from a non-geo enabled data source, at an interception point between the non-geo enabled data source and an application receiving the data;
 obtaining information related to location in the received data, wherein obtaining the information related to location in the received data comprises:
  identifying a physical address in the received data; and
  looking up geographical coordinates from the physical address;
 converting the obtained information to a standardized form of geo-location data compatible with the application; and
 providing the geo-location data to the application, wherein converting the obtained information is performed by the interception point between the non-geo enabled data source and the application such that the application perceives that the data source is directly providing the geo-location data and is geo enabled.

2. The method of claim 1 wherein the interception point comprises an interface on a gateway and wherein the obtained data comprises a payload.

3. The method of claim 2 wherein the payload comprises an OData payload, wherein the converted obtained information comprises an OData payload.

4. The method of claim 1 and further comprising formatting the geographical coordinates comprising latitude and longitude in a concatenated form.

5. The method of claim 1 wherein looking up geographical coordinates comprises calling a remote service to translate the physical address into standard geo coordinates.

6. The method of claim 1 wherein identifying a physical address in the received data comprises:
 identifying a key in the received data; and
 using the key to call a remote application to obtain information leading to a physical address.

7. The method of claim 6 wherein the key comprises business data and wherein the remote application comprises business object.

8. The method of claim 1 wherein the method is performed by a computer executing code separate from the non-geo enabled data source.

9. The method of claim 1 wherein obtaining information related to location further comprises:
 identifying a user id;
 mapping the user id to a location tracking service; and
 calling the location tracking service to obtain the information related to location.

10. The method of claim 1 wherein the standardized form is an enhanced form of the format of the received data.

11. The method of claim 1 wherein the standardized form is a different format than the format of the received data.

12. A computer readable storage device having instructions for causing a computer to execute a method, the method comprising:

receiving data from a non-geo enabled data source, at an interception point between the non-geo enabled data source and an application receiving the data;

obtaining information related to location in the received data, wherein obtaining the information related to location in the received data comprises:

identifying a physical address in the received data and looking up geographical coordinates from the physical address;;

converting the obtained information to a standardized form of geo-location data compatible with the application; and providing the geo-location data to the application, wherein converting the obtained information is performed by the interception point between the non-geo enabled data source and the application such that the application perceives that the data source is directly providing the geo-location data and is geo enabled.

13. The computer readable storage device of claim 12, the method further comprising:

formatting the geographical coordinates comprising latitude and longitude in a concatenated form.

14. The computer readable storage device of claim 12 wherein identifying a physical address in the received data comprises:

identifying a key in the received data; and using the key to call a remote application business object to obtaining information leading to a physical address.

15. The computer readable storage device of claim 12 wherein obtaining information related to location further comprises:

identifying a user id; and mapping the user id to a location tracking service; and calling the location tracking service to obtain the information related to location.

16. A system comprising:

a communication connection to receive data from a non-geo enabled data source as an interception point between the non-geo enabled data source and an application receiving the data;

a programmed processor coupled to receive the data from the communication connection to obtain information related to location in the received data, wherein obtaining the information related to location in the received data comprises:

identifying a physical address in the received data and looking up geographical coordinates from the physical address;

the processor further programmed to convert the obtained information to a standardized form of geo-location data compatible with the application; and an application stored on a storage device coupled to the processor to, receive the geo location data such that the application perceives that the data source is directly providing the geo-location data and is geo enabled.

17. The system of claim 16 wherein obtaining the information related to location in the received data further comprises:

formatting the geographical coordinates comprising latitude and longitude in a concatenated form.

18. The system of claim 16 wherein looking up geographical coordinates comprises calling a remote service to translate the physical address into standard geo coordinates.

19. The system of claim 16 wherein identifying a physical address in the received data comprises:

identifying a key in the received data; and using the key to call a remote application to obtaining information leading to a physical address, wherein the key comprises business data and wherein the remote application comprises business object.

20. The system of claim 16 wherein identifying a physical address in the received data further comprises:

identifying a user id;

mapping the user id to a location tracking service; and calling the location tracking service to obtain the information related to location.

\* \* \* \* \*